O & C. Waste,
Hay Press.
N° 45,284.   Patented Nov. 29, 1864.

Witnesses
E. W. Rowe
J. W. Bone

Inventors
Orson Waste
Chas Waste

UNITED STATES PATENT OFFICE.

ORSON WASTE AND CHARLES WASTE, OF CAMERON, ILLINOIS.

CONSTRUCTING BALES OF HAY.

Specification forming part of Letters Patent No. 45,284, dated November 29, 1864.

*To all whom it may concern:*

Be it known that we, ORSON WASTE and CHARLES WASTE, of Cameron, Warren county, and State of Illinois, have invented a new and Improved Mode of Making and Constructing Bales of Hay; and we do hereby declare that the following is a full and exact description thereof, reference being had to the accompanying drawings.

The method of constructing bales of hay hitherto in use has not enabled the workman to construct them in so compact and perfect a form as they are capable of assuming.

In the common lever-press the hay is placed in bulk into the press-box, and the follower is then urged through the box, and the bulk of hay is forced into a smaller space. This, however, does not press the bulk originally placed in the press-box into as small a space as it can be made to occupy. The elastic force of each stem throughout the mass of hay is not destroyed, the spaces in the tubes or stems are not closed, and the hay is not compactly pressed. The same difficulty is presented in the use of the beater press. While in the early stages of the making of the bale, the elasticity is nearly, if not quite destroyed, yet after a small portion of the bale is formed the desired effect is not obtained, by reason of the force of concussion being diminished by the elasticity of the hay already deposited; hence in the methods of constructing bales hitherto known it has been found impossible to make a bale as compactly or to put as much hay into a given space as was required.

The object and nature of this invention is to construct a bale of hay of uniform density by making it of sheets or layers which have been previously crushed and cut, thus securing as much hay as possible in a given space.

Figure 1:
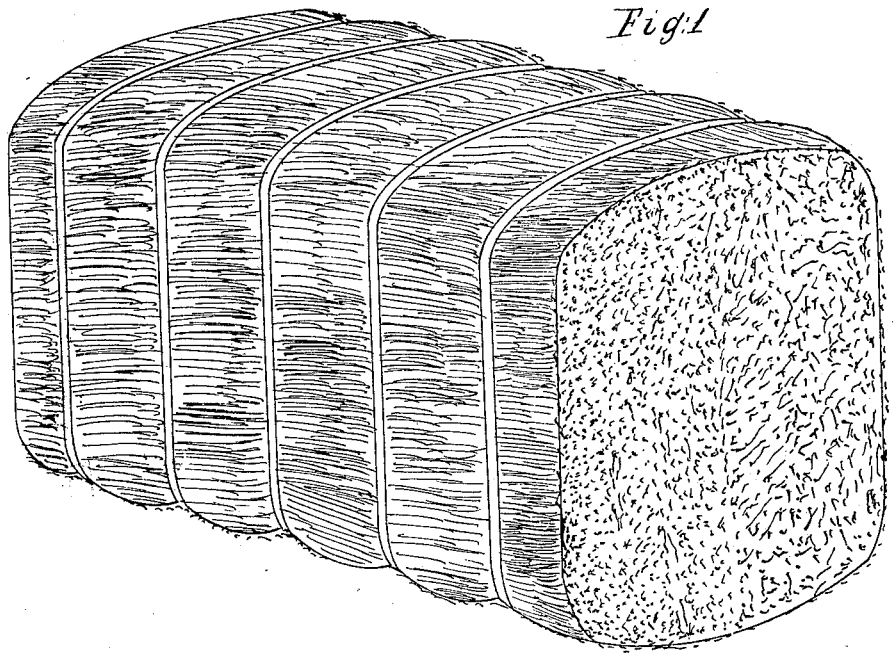
Figure 2:
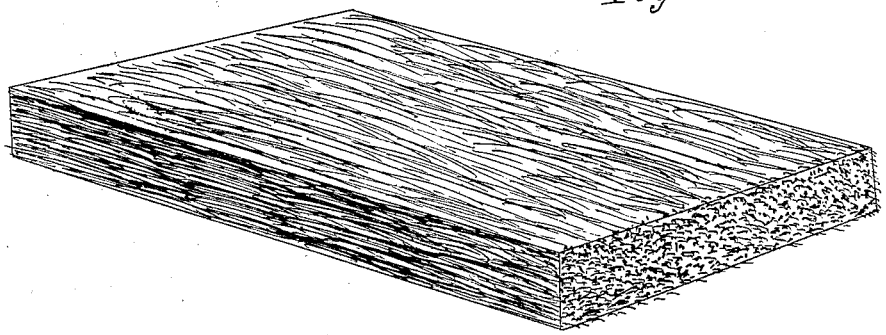

Figure 1 is a perspective of a bale of hay when finished and ready for shipping. Fig. 2 is a perspective of one of the sheets after it has been formed and ready to be placed into the press-box for final pressing.

We construct our bale of hay in the ordinary form externally.

In the constructing of a bale the hay is taken in the loose form and is passed between two pressure-rollers properly located with reference to each other, and also properly operated. This completely destroys the elasticity of the hay, the stems or stalks are crushed, the hollow in the tubes is closed, and the hay is thus reduced to nearly a solid form. As it is delivered from the rollers, it is cut into sheets of the required length. A sufficient number of these sheets, being so crushed and so cut, are then placed into a press-box of ordinary form and size by laying them one above the other, and are pressed into a bale in the ordinary way. A bale is thus formed, first, of sheets of hay which are crushed and cut and nearly in a solid form; second, the bale is uniformly pressed throughout the entire bulk, and a greater quantity of hay can be placed in a bale of the ordinary size, and a great saving in the transportation and storage of hay is thus made.

Having thus described our invention, what we claim as new, and desire to secure by Letters Patent, is—

The constructing and arranging a bale of hay with layers or sheets of hay which have been pressed or crushed and cut, in the manner described.

ORSON WASTE.
CHAS. WASTE.

Witnesses:
E. W. ROUSE,
T. W. BONE.